(12) United States Patent
Wang et al.

(10) Patent No.: US 12,372,808 B2
(45) Date of Patent: Jul. 29, 2025

(54) SPECTACLE LENS

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Hongbin Fan, Nantong (CN); Qingbo Yan, Nantong (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 704 days.

(21) Appl. No.: 17/659,941

(22) Filed: Apr. 20, 2022

(65) Prior Publication Data

US 2023/0288726 A1  Sep. 14, 2023

(30) Foreign Application Priority Data

Mar. 10, 2022  (CN) .......................... 202210240675.8

(51) Int. Cl.
*G02C 7/02* (2006.01)

(52) U.S. Cl.
CPC ......... *G02C 7/022* (2013.01); *G02C 2202/24* (2013.01)

(58) Field of Classification Search
CPC .... G02C 7/022; G02C 2202/24; G02C 7/021; G02C 7/16; G02C 7/06
See application file for complete search history.

(56) References Cited

U.S. PATENT DOCUMENTS

2017/0131567 A1* 5/2017 To ............................ G02C 7/06

* cited by examiner

*Primary Examiner* — James C. Jones
(74) *Attorney, Agent, or Firm* — CBM PATENT CONSULTING, LLC

(57) ABSTRACT

A spectacle lens includes a first region having a refractive power for ametropia based on corrected visual acuity; and a second region having an unfocused imaging function; the first region and the second region being disposed on a lens surface, the second region including a plurality of sub-regions independent of each other, and the first region being a region on the lens surface other than the second region; wherein the first region has a function of focusing an image on the retina of an eye while correcting the ametropia, and the second region has a function of limiting image focusing, whereby the combination of both inhibits or slows down development of myopia and hyperopia by limiting imaging in front of or behind the retina by the second region while visually distinguishing the image of an object formed by the first region.

7 Claims, 6 Drawing Sheets

SPECTACLE LENS

CROSS REFERENCES

This application claims priority to Chinese Patent Application Ser. No. 202210240675.8 filed on 10 Mar. 2022.

TECHNICAL FIELD

The present invention belongs to the field of lenses, relates to a spectacle lens, and more particularly, relates to a spectacle lens with the function of inhibiting or at least alleviating ametropia of human eyes.

BACKGROUND

Myopia of the eye is characterized in that distant objects are focused by the eye in front of its retina, and hyperopia of the eye is characterized in that distant objects are focused by the eye behind its retina. Myopia is usually corrected with a concave lens, and hyperopia is usually corrected with a convex lens.

When using a conventional single vision optical lens to correct myopia, the central part of an image is transmitted on the retina, but its peripheral parts are transmitted behind the retina, thereby inducing the eyeball to grow to a position behind the retina, increasing the axial length of the eye, and developing the refractive state of the eye to more serious myopia.

When using a conventional single vision optical lens to correct presbyopia, the central part of an image is transmitted on the retina, but its peripheral parts are transmitted in front of the retina, thereby inducing the eyeball to grow to a position in front of the retina, decreasing the axial length of the eye, and developing the refractive state of the eye to more serious hyperopia.

Through patent search, it is found that for visual acuity prevention and control lenses, foreign patents include the lenses described in Japanese Patent Publication No. 44891249, which are concentric Fresnel multifocal lenses.

The national patents include CN104678572B, CN11390809A, etc. These patents generally correct the ametropia of visual acuity through a first region, and increase the positive or negative refractive power to the first region through the second region to make the peripheral parts of an image transmitted in front of or behind the retina, thereby having the function of inhibiting or at least slowing down the development of myopia or hyperopia.

The above-mentioned lenses have the problems of high processing difficulty and high processing costs, such that the selling price is high, which is not conducive to the promotion and popularization of visual acuity prevention and control lenses.

SUMMARY

Directing at the above-mentioned defects, an object of the present invention is to provide a spectacle lens which corrects ametropia of visual acuity through a first region and limits the situation that an image is focused behind or in front of the retina through a second region, thereby slowing down the development of myopia or hyperopia.

In order to achieve the above objective, the present invention is implemented through the following technical solutions.

A spectacle lens, including
a first region having a refractive power for ametropia based on corrected visual acuity;
and a second region having an unfocused imaging function;
the first region and the second region being disposed on a lens surface, the second region including a plurality of sub-regions independent of each other, and the first region being a region on the lens surface other than the second region.

Preferably, the refractive power of the first region is acquired by adjusting a difference in curvatures of front and back surfaces of the lens, and for lenses with different refractive indexes, a difference in front and back curvatures is required diopter, which may be myopia diopter or hyperopia diopter.

Preferably, the second region does not focus an image at a position behind or in front of the retina of an eye by reducing surface finish, thereby slowing down the development of myopia or hyperopia. Reducing the surface finish allows the lens to maintain brightness, but not focus, not image.

Preferably, the second region is of an annular structure surrounding the optical center of the lens as a whole, both its inner and outer edges are symmetrical in shape, and the inner and outer edges can be the same in shape and can also be different in shape. The sub-regions of the second region are also symmetrical in shape.

Preferably, the symmetrical shapes satisfy axial symmetry and central symmetry at the same time, including but not limited to circles, squares, or regular hexagons, and can also be other regular polygons satisfying axial symmetry and central symmetry.

Preferably, the first region surrounded by the inner edge of the second region has a maximum diameter of 5.0 mm to 20 mm, and the sub-region in the second region has a maximum diameter of 0.1 mm to 2.0 mm. When the above-mentioned symmetrical shape is a circle, the maximum diameter is the diameter of the circle, and when the symmetrical shape is the regular polygon, the maximum diameter is a length of the diagonal of the regular polygon.

Preferably, a distance between adjacent sub-regions in the second region is 0.1 mm to 3.0 mm.

Preferably, the second region can be disposed on the front surface or back surface of the lens.

Preferably, the total area of the second region is 20%-70% of the total area of the lens surface on which it is located.

Compared with the prior art, the present invention has the following beneficial effects.

The first region of the spectacle lens of the present invention has a function of focusing an image on the retina of an eye while correcting the ametropia, and the second region of the spectacle lens has a function of limiting image focusing, whereby the combination of both inhibits or at least slows down development of myopia and hyperopia by limiting imaging in front of or behind the retina by the second region while visually distinguishing the image of an object formed by the first region.

In FIGS.: 1—first region, 2—second region, 21—sub-region, 3—front surface, 4—back surface.

DETAILED DESCRIPTION

The following describes the exemplary implementations of the present invention in detail with reference to the accompanying drawings and specific embodiments.

Embodiment 1

Figure 1:
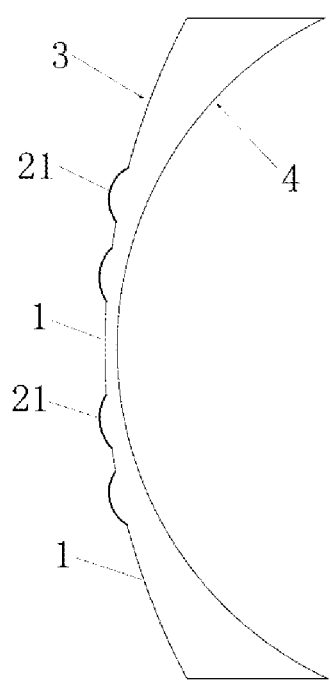
FIG. 1 is a schematic structural side view of a spectacle lens according to Embodiment 1.
Figure 2:
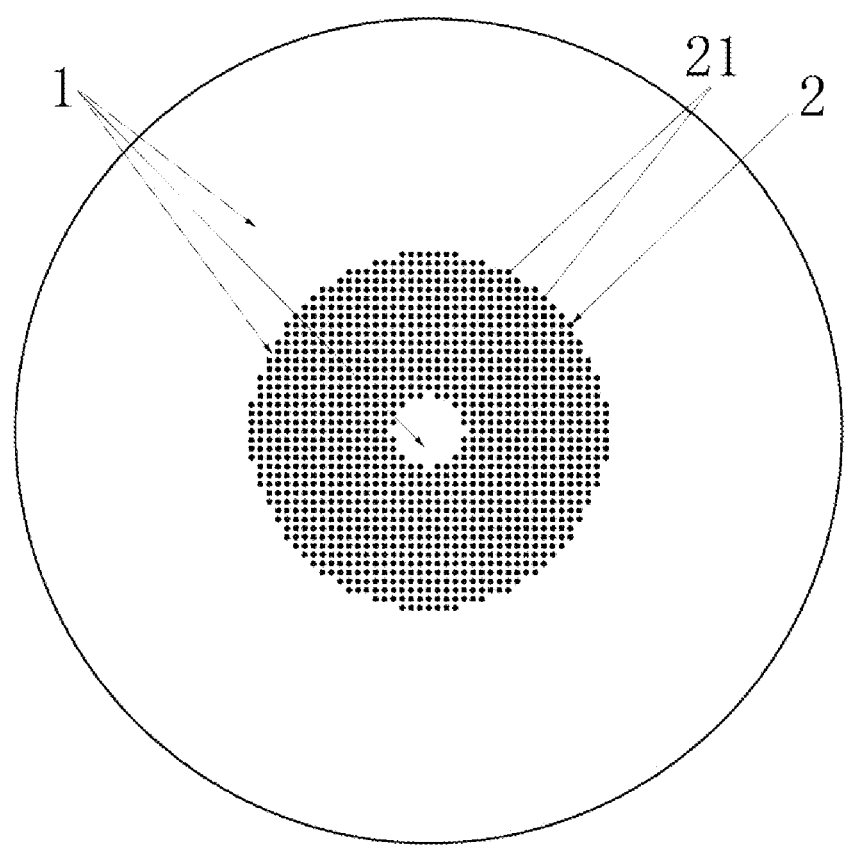
FIG. 2 is a schematic structural view of a front surface of spectacle lenses according to Embodiment 1 and Embodiment 2.

A spectacle lens as shown in FIG. 1 and FIG. 2 is a myopia prevention and control lens, and a concave lens including a front surface 3 and a rear surface 4, and the front surface 3 is provided with a first region 1 and a second region 2. The first region 1 has a refractive power for correcting myopia, diopter is a difference in curvatures of the front surface 3 and the back surface 4 of the lens, and the second region 2 does not focus an image at a position behind the retina of an eye by reducing surface finish, thereby slowing down the development of myopia.

The second region 2 of this embodiment includes a plurality of sub-regions 21 independent of each other, the first region 1 is a region on the lens surface other than the second region 2, and the total area of the second region 2 is 30% of the total area of the front surface 3 of the lens.

Figure 3:
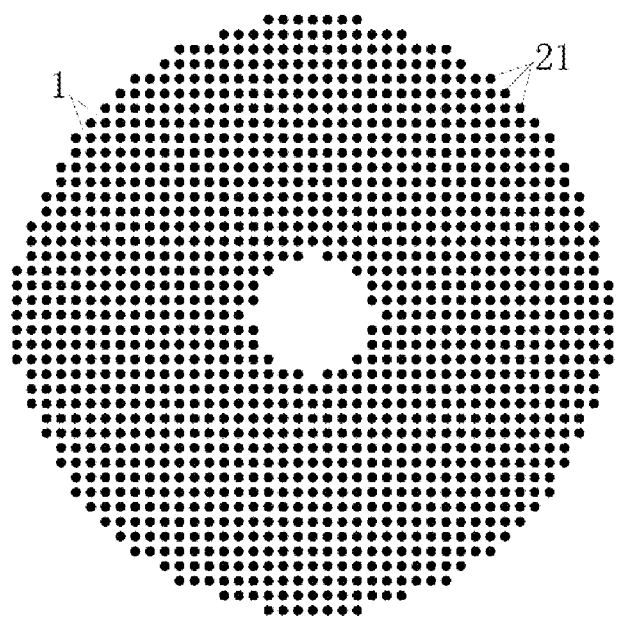
FIG. 3 is a schematic structural view of a second region according to Embodiment 1 and Embodiment 2.

As shown in FIG. 3, the second region 2 of this embodiment is of a ring structure surrounding the optical center of the lens as a whole, both its inner and outer edges are circular, and the sub-region 21 of the second region 2 is also circular.

The first region 1 surrounded by the inner edge of the second region 2 in this embodiment has a diameter of 5.0 mm, the sub-region 21 in the second region 2 has a diameter of 0.1 mm, and a distance between adjacent sub-regions is 0.1 mm.

Figure 4:
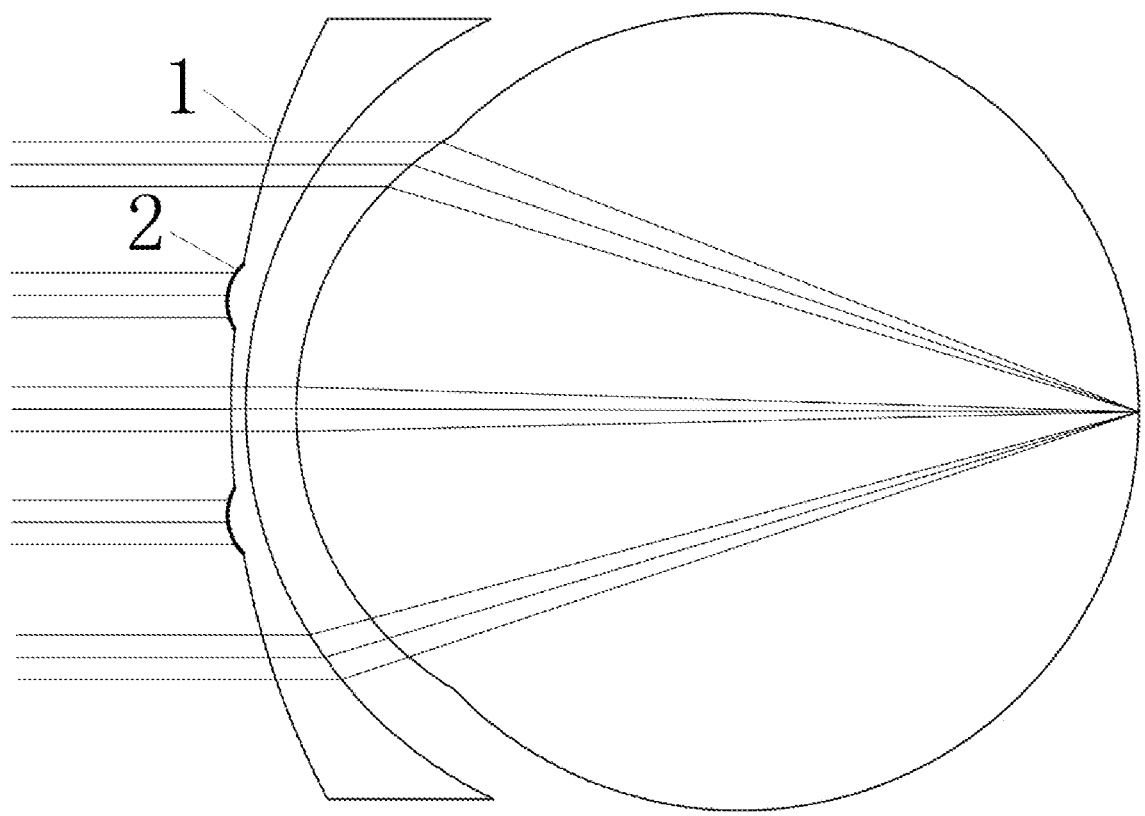
FIG. 4 is a beam trajectory chart of the lens according to Embodiment 1.

As shown in FIG. 4, when a patient uses the myopia prevention and control lens described in this embodiment to view an object, an image is formed on the retina through the first region 1, while the second region 2 is opaque, limiting imaging behind the retina to inhibit or at least slow down the development of myopia.

Embodiment 2

Figure 5:
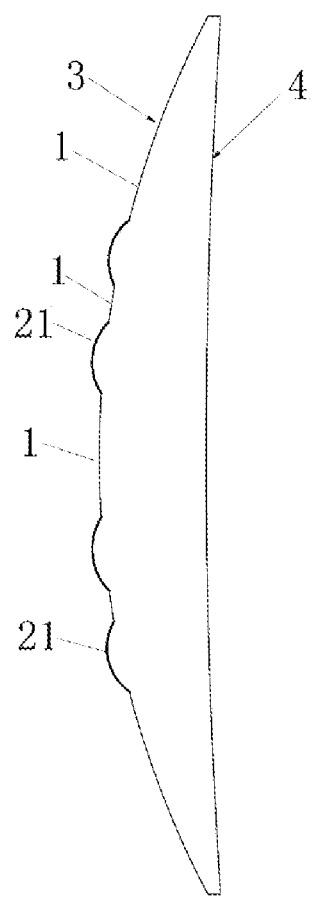
FIG. 5 is a schematic structural side view of the spectacle lens according to Embodiment 2.

A spectacle lens as shown in FIG. 5 and FIG. 2 is a hyperopia prevention control lens, and a convex lens including a front surface 3 and a rear surface 4, and the front surface 3 is provided with a first region 1 and a second region 2. The first region 1 has a refractive power for correcting hyperopia, diopter is a difference in curvatures of the front surface 3 and the back surface 4 of the lens, and the second region 2 does not focus an image at a position in front of the retina of an eye by reducing surface finish, thereby slowing down the development of hyperopia.

The second region 2 includes a plurality of sub-regions 21 independent of each other, the first region 1 is a region on the lens surface other than the second region 2, and the total area of the second region 2 is 30% of the total area of the front surface of the lens.

As shown in FIG. 3, the second region 2 of this embodiment is of a ring structure surrounding the optical center of the lens as a whole, both its inner and outer edges are circular, and the sub-region 21 of the second region 2 is also circular.

The first region 1 surrounded by the inner edge of the second region 2 in this embodiment has a diameter of 5.0 mm, the sub-region 21 in the second region 2 has a diameter of 0.1 mm, and a distance between adjacent sub-regions is 0.1 mm.

Figure 6:
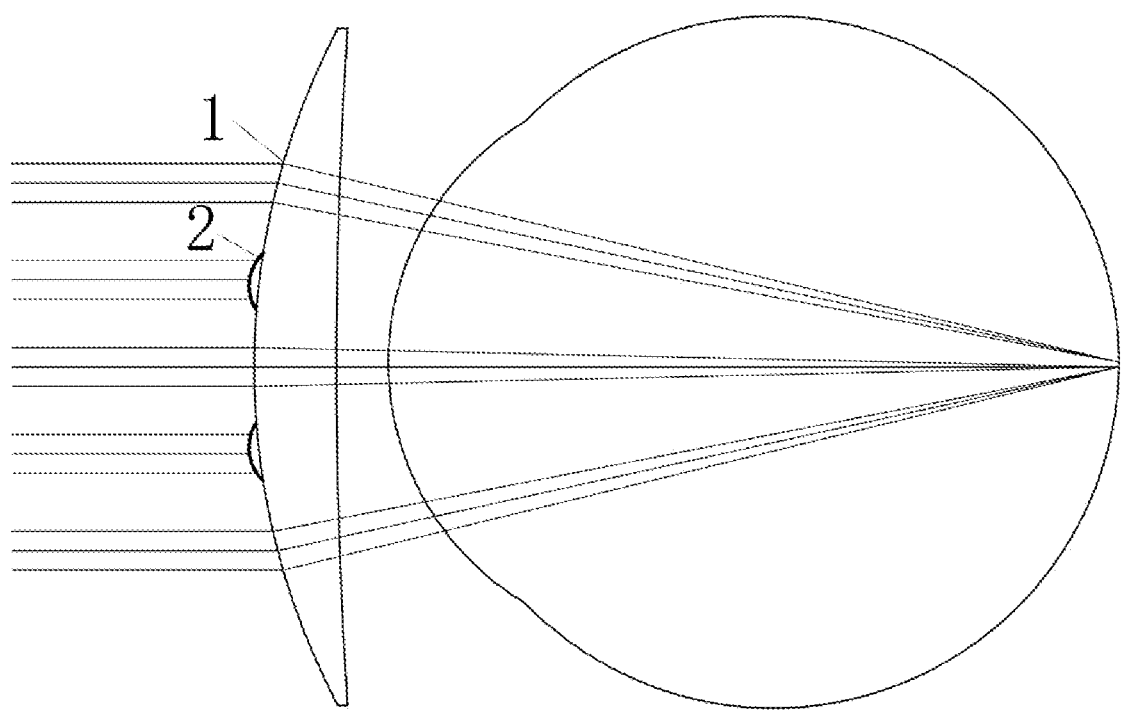
FIG. 6 is a beam trajectory chart of the lens according to Embodiment 2.

As shown in FIG. 6, when a patient uses the hyperopia prevention and control lens described in this embodiment to view an object, an image is formed on the retina through the first region 1, while the second region 2 is opaque, limiting imaging in front of the retina to inhibit or at least slow down the development of hyperopia.

In the description of this application, it should be understood that orientation or position relationships indicated by the terms such as "center", "longitudinal", "lateral", "above", "below", "front", "rear", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention. In addition, the terms "first" and "second" are used for descriptive purposes only and are not to be construed as indicating or implying relative importance or implicitly indicating the number of technical features indicated. Therefore, features defining "first", "second", and the like may explicitly or implicitly include one or more such features. In descriptions of the present invention, "a plurality of" means two or more, unless otherwise stated.

The embodiments of the present invention are described above, and the foregoing descriptions are exemplary but not exhaustive and are not limited to the disclosed embodiments. Without departing from the scope and technical principle of the described embodiments, many modifications and variations are apparent to a person of ordinary skill in the art, and the modifications and variations shall fall within the protection scope of the present invention.

What is claimed is:

1. A spectacle lens, comprising:
    a first region having a refractive power for ametropia based on corrected visual acuity, when a lens is used to view an object, an image is formed on retina through the first region;
    and a second region having an unfocused imaging function, when the image is formed through the first region, the second region is opaque and limited to imaging in front of or behind the retina to inhibit or at least slow down the development of hyperopia or myopia;
    the first region and the second region being disposed on a lens surface, the second region comprising a plurality of sub-regions independent of each other, and the first region being a region on the lens surface other than the second region;
    the second region does not focus an image at a position behind or in front of the retina of an eye by reducing surface finish; the second region is of an annular structure surrounding the optical center of the lens as a whole, and both its inner and outer edges are symmetrical in shape;

the first region surrounded by the inner edge of the second region has a maximum diameter of 5.0 mm to 20 mm, the sub-region in the second region has a maximum diameter of 0.1 mm to 2.0 mm, a distance between adjacent sub-regions in the second region is 0.1 mm to 3.0 mm;

the second region reduces surface finish so that the second region does not focus the image behind or in front of the retina, and the reduced surface finish keeps the lens and opaque.

2. The spectacle lens according to claim 1, wherein the refractive power of the first region is acquired by adjusting a difference in curvatures of front and back surfaces of the lens.

3. The spectacle lens according to claim 1, wherein the sub-regions in the second region are symmetrical in shape.

4. The spectacle lens according to claim 1, wherein the symmetrical shapes satisfy axial symmetry and central symmetry at the same time, including but not limited to circles, squares, or regular hexagons.

5. The spectacle lens according to claim 1, wherein the second region is disposed on the front surface or the back surface of the lens.

6. The spectacle lens according to claim 1, wherein the total area of the second region is 20%-70% of the total area of the lens surface on which it is located.

7. The spectacle lens according to claim 3, wherein the symmetrical shapes satisfy axial symmetry and central symmetry at the same time, including but not limited to circles, squares, or regular hexagons.

* * * * *